(12) United States Patent
Akulov

(10) Patent No.: US 11,308,164 B2
(45) Date of Patent: Apr. 19, 2022

(54) METHOD AND SYSTEM FOR GENERATING PUSH NOTIFICATIONS RELATED TO DIGITAL NEWS

(71) Applicant: YANDEX EUROPE AG, Lucerne (CH)

(72) Inventor: Yaroslav Victorovich Akulov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 267 days.

(21) Appl. No.: 16/387,639

(22) Filed: Apr. 18, 2019

(65) Prior Publication Data

US 2020/0089711 A1 Mar. 19, 2020

(30) Foreign Application Priority Data

Sep. 17, 2018 (RU) ............................ RU2018132851

(51) Int. Cl.
*G06F 16/00* (2019.01)
*G06F 16/903* (2019.01)
*G06F 16/906* (2019.01)
*G06F 16/951* (2019.01)
*G06F 16/908* (2019.01)
*G06F 16/9035* (2019.01)
*H04L 67/55* (2022.01)

(52) U.S. Cl.
CPC ...... *G06F 16/90348* (2019.01); *G06F 16/906* (2019.01); *G06F 16/908* (2019.01); *G06F 16/9035* (2019.01); *G06F 16/951* (2019.01); *H04L 67/26* (2013.01)

(58) Field of Classification Search
CPC .......... G06F 16/90348; G06F 16/9035; G06F 16/906; G06F 16/908; G06F 16/95; G06F 16/951; H04L 67/02; H04L 67/26
USPC ................................................ 707/600–899
See application file for complete search history.

(56) References Cited

U.S. PATENT DOCUMENTS 7,502,789 B2    3/2009  Yao et al.
7,565,367 B2 *  7/2009  Barrett ................ G06F 16/9535
(Continued)

FOREIGN PATENT DOCUMENTS

CN    105045890 A    11/2015
CN    105095368 A    11/2015
(Continued)

*Primary Examiner* — Michelle N Owyang
(74) *Attorney, Agent, or Firm* — BCF LLP

(57) ABSTRACT

A method and a system for determining an importance score associated with a digital news item, the importance score for determining push notifications to be provided to a user of an electronic device. The method comprises accessing a digital news item, the digital news item having been electronically published at a news item publication time by a digital news source, the digital news source being accessible via a communication network; determining a source weight of the digital news source; determining the importance score of the digital news item based on the news item publication time and the source weight of the corresponding digital news source; in response to the importance score of the digital news item being above an importance score threshold, generating a push notification based on the digital news item; and transmitting the push notification by the server to the electronic device.

20 Claims, 7 Drawing Sheets

(56) References Cited

U.S. PATENT DOCUMENTS

| | | |
|---|---|---|
| 7,568,148 B1 | 7/2009 | Bharat |
| 8,145,623 B1* | 3/2012 | Mehta .................. G06F 16/355 |
| | | 707/713 |
| 8,903,910 B2 | 12/2014 | Kallayil |
| 9,183,573 B2 | 11/2015 | Tseng |
| 9,275,156 B2 | 3/2016 | Zhou et al. |
| 9,582,786 B2 | 2/2017 | Gubin et al. |
| 2005/0060312 A1 | 3/2005 | Curtiss et al. |
| 2008/0016101 A1* | 1/2008 | Ginsburg .............. G06F 16/951 |
| 2010/0257113 A1 | 10/2010 | Dorrell |
| 2013/0332523 A1* | 12/2013 | Luu ................... G06Q 30/0269 |
| | | 709/204 |
| 2014/0129661 A1 | 5/2014 | Thyagaraja |
| 2014/0143259 A1 | 5/2014 | Jain |
| 2014/0164365 A1 | 6/2014 | Graham |
| 2014/0195605 A1* | 7/2014 | Kallayil .................. H04L 67/22 |
| | | 709/204 |
| 2014/0289054 A1* | 9/2014 | Capel ................. G06Q 30/0269 |
| | | 705/14.66 |
| 2015/0317287 A1 | 11/2015 | Schacht et al. |
| 2016/0005516 A1 | 2/2016 | Cantarero et al. |
| 2016/0055164 A1 | 2/2016 | Cantarero et al. |
| 2016/0359790 A1 | 12/2016 | Zhang et al. |
| 2016/0359791 A1 | 12/2016 | Zhang et al. |
| 2017/0094364 A1* | 3/2017 | Karim ................ H04N 21/2743 |
| 2017/0171139 A1 | 6/2017 | Marra et al. |
| 2017/0270121 A1 | 9/2017 | Gu et al. |
| 2017/0289288 A1 | 10/2017 | Marra et al. |
| 2019/0164082 A1* | 5/2019 | Wu ........................ G06Q 50/01 |
| 2019/0188285 A1* | 6/2019 | Scheau ............... G06F 16/9038 |

FOREIGN PATENT DOCUMENTS

| | | |
|---|---|---|
| CN | 106484733 A | 3/2017 |
| CN | 107241260 A | 10/2017 |
| CN | 107784010 A | 3/2018 |
| CN | 107944001 A | 4/2018 |
| WO | 15143911 A1 | 10/2015 |

\* cited by examiner

US 11,308,164 B2

METHOD AND SYSTEM FOR GENERATING PUSH NOTIFICATIONS RELATED TO DIGITAL NEWS

CROSS-REFERENCE

The present application claims priority to Russian Patent Application No. 2018132851, entitled "Method and System for Generating Push Notifications Related to Digital News," filed Sep. 17, 2018, the entirety of which is incorporated herein by reference.

FIELD

The present technology relates to notification systems in general and specifically to a method and a system for generating push notifications related to digital news.

BACKGROUND

Numerous news articles on various topics are published daily on the internet. Some news topics are of general interest, others are of the niche interest. By the same token, some news topics are more important (relative to a larger population group) and the others are less important (relative to the larger population group). Users, however, would like to be informed of the most recent and the most important news, so-called "hot news" or "breaking news".

To receive the news updates, users can subscribe to a push notification service that can periodically send to the service subscribers' devices "push notifications" related to news items that are deemed to be important based on the news items ranking algorithms employed by the push notification service. When an important news item appears, the user can receive the push notification notifying the user of the news items, which notification can also include a brief summary of the news item/the news event.

In order to determine which news item to notify the user about by sending her a push notification, the system need to be able to determine which news item is more important than the remainder of the news items. A human assessor could judge which news are most important and manually select the news items to be pushed to the user. However, such approach is time-consuming, unreliable and the news pushed to the subscribers may reflect the bias of the human assessor.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Current approach to determining the importance of the news is based on a click through rate (CTR) of the news articles and can be inaccurate due to potential presence of large number of click-bait content in the news flow which can skew the CTR of many articles.

Embodiments of the present technology have been developed based on developers' appreciation that, in order to determine push notifications to be provided to a user of an electronic device, importance scores associated with the digital news items can be determined. More specifically, the importance score of the digital news item can be determined based on a news item publication time and a source weight of the corresponding digital news source. In response to the importance score of the digital news item being above an importance score threshold, the server may generate a push notification based on the digital news item.

In accordance with a first broad aspect of the present technology, there is provided a method for determining an importance score associated with a digital news item, the importance score for determining push notifications to be provided to a user of an electronic device, the method executable by a server, the server connectable to the electronic device via a communication network, the method comprising: accessing, by the server, a digital news item, the digital news item having been electronically published at a news item publication time by a digital news source, the digital news source being accessible via the communication network; determining a source weight of the digital news source; determining, by the server, the importance score of the digital news item based on the news item publication time and the source weight of the corresponding digital news source; in response to the importance score of the digital news item being above an importance score threshold, generating, by the server, a push notification based on the digital news item; and transmitting the push notification by the server to the electronic device.

In some embodiments of the method, the digital news item is one of a plurality of digital news items, and the method further comprises: accessing, by the server, the plurality of digital news items; generating at least one digital news cluster each having at least a subset of the plurality of digital news items; determining, by the server, a respective importance score for each one of the plurality of digital news items, each importance score being determined for each one of the plurality of digital news items based on the respective news item publication time and source weight of the respective digital news source; determining, by the server, a respective importance rank of each of at least one digital news cluster based on respective importance scores of at least one digital news item associated therewith; and selecting a representative digital news item for the at least one digital news cluster; and wherein the generating the push notification is executed in response to the importance rank being above the importance rank threshold and the generating the push notification is based on the representative digital news item.

In some embodiments of the method, the selecting the representative digital news item is based on the time-freshness of the digital news items within the associated at least one digital news cluster.

In some embodiments of the method, the determining source weight comprises determining a number of users accessing the associated digital news source over a predetermined past time interval.

In some embodiments of the method, the determining the number of users comprises receiving statistics from at least one of: browser logs installed on at least one user electronic device; web site metric application installed on the respective digital news source; and search engine logs data indicative of click information where clicks are directed to the respective digital news source from a search engine result page displayed to at least one search engine user.

In some embodiments of the method, the determining the importance score of the digital news item based on the news item publication time and the source weight of the corresponding digital news source comprises determining the importance score that is inverse to the news item publication time; and is proportionate to the source weight.

In some embodiments of the method, the determining the importance score of the digital news item based on the news item publication time and the source weight of the corresponding digital news source comprises: determining a publication time function F(t) based on the news item publication time of the digital news item; and determining the importance score r of the digital news item according to the formula:

$$r = W^S * F(t),$$

where $W^S$ is the source weight of the corresponding digital news source of the digital news item.

In some embodiments of the method, the determining the publication time function F(t) comprises determining:

$$F(t) = \text{sigm}(t^0 - t^{publ}),$$

where sigm is a sigmoid function; and $(t^0 - t^{publ})$ is a difference between a sampling time $t^0$ and the news item publication time $t^{publ}$.

In some embodiments of the method, the determining the importance rank of each of the at least one digital news cluster comprises: for each digital news cluster, determining a publication time function $F_k(t)$ of each digital news item of a plurality of cluster digital news items within the digital news cluster based on the news item publication time of the digital news item, each of the digital news items being a k-th digital news item, k being an integer between 1 and a number of digital news items m within the digital news cluster; for each digital news cluster, determining the importance score $r_k$ of each digital news item according to the formula:

$$r_k = W_k^S * F_k(t),$$

where $W_k^S$ is the source weight of the corresponding digital news source of the k-th digital news item; and determining the importance rank of each of the at least one digital news cluster according to the formula:

$$R = \Sigma_{k=1}^m r_k.$$

In some embodiments of the method, the determining the publication time function $F_k(t)$ comprises determining:

$$F_k(t) = \text{sigm}(t_k^0 - t^{publ}),$$

where sigm is a sigmoid function; and $(t^0 - t_k^{publ})$ is a difference between a sampling time $t^0$ and the news item publication time $t_k^{publ}$.

In some embodiments of the method, prior to pushing the notification based on the representative digital news item, verifying whether the representative digital news has been already pushed within a threshold time interval.

In some embodiments of the method, the method further comprises maintaining a push notification database that includes a list of past push notifications: the verifying whether the representative digital news item has been already pushed further comprises comparing an indication of the push notification with indications of past push notifications in the push notification database; the transmitting the push notification is executed in response to the push notification not matching any of the indications of past push notifications stored in the push notification database; and wherein the method further comprises updating the push notification database after the transmitting the push notification with the indication of the push notification.

In some embodiments of the method, the generating at least one digital news cluster each having at least a subset of the plurality of digital news items comprises, after a pre-determined cluster determination delay: re-analyzing at least a portion of the plurality of digital news items to determine the at least one digital news cluster and the at least one digital news item associated therewith.

In some embodiments of the method, generating the at least one digital news cluster comprises for each digital news cluster determining the digital news items published within a cluster publication time period.

In some embodiments of the method, the cluster publication time period is prior to a sampling time.

In some embodiments of the method, the push notification is one of a plurality of push notifications, and wherein the method further comprises: determining the importance rank threshold based on a target number of push notifications of the plurality of push notifications.

In some embodiments of the method, the determining a plurality of digital news sources further comprises determining each of the plurality of digital news sources is trustworthy.

In some embodiments of the method, the determining the importance score of the digital news item based on the news item publication time and the source weight of the corresponding digital news source comprises: analyzing, by the server, a concentration of a number of times the digital news item has been published around the news item publication time.

In some embodiments of the method, the analyzing further comprises taking into account a time span between the news item publication time and a current time.

In some embodiments of the method, the analyzing is executed at a current time, and wherein the method further comprises taking into account a time span between the news item publication time and a pre-determined past time point that occurred between the current time and the news publication time.

In some embodiments of the method, the pre-determined past time is a point in time associated with a spike in the concertation of the number of times the news item has been published for a given digital news item.

In accordance with another broad aspect of the present technology, there is provided a system for determining an importance score associated with a digital news item, the importance score for determining push notifications to be provided to a user of an electronic device, the system comprising a server, the server connectable to the electronic device via a communication network, the server configured to: access a digital news item, the digital news item having been electronically published at a news item publication time by a digital news source, the digital news source being accessible via the communication network; determine a source weight of the digital news source; determine the importance score of the digital news item based on the news item publication time and the source weight of the corresponding digital news source; in response to the importance score of the digital news item being above an importance score threshold, generate a push notification based on the digital news item; and transmit the push notification to the electronic device.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
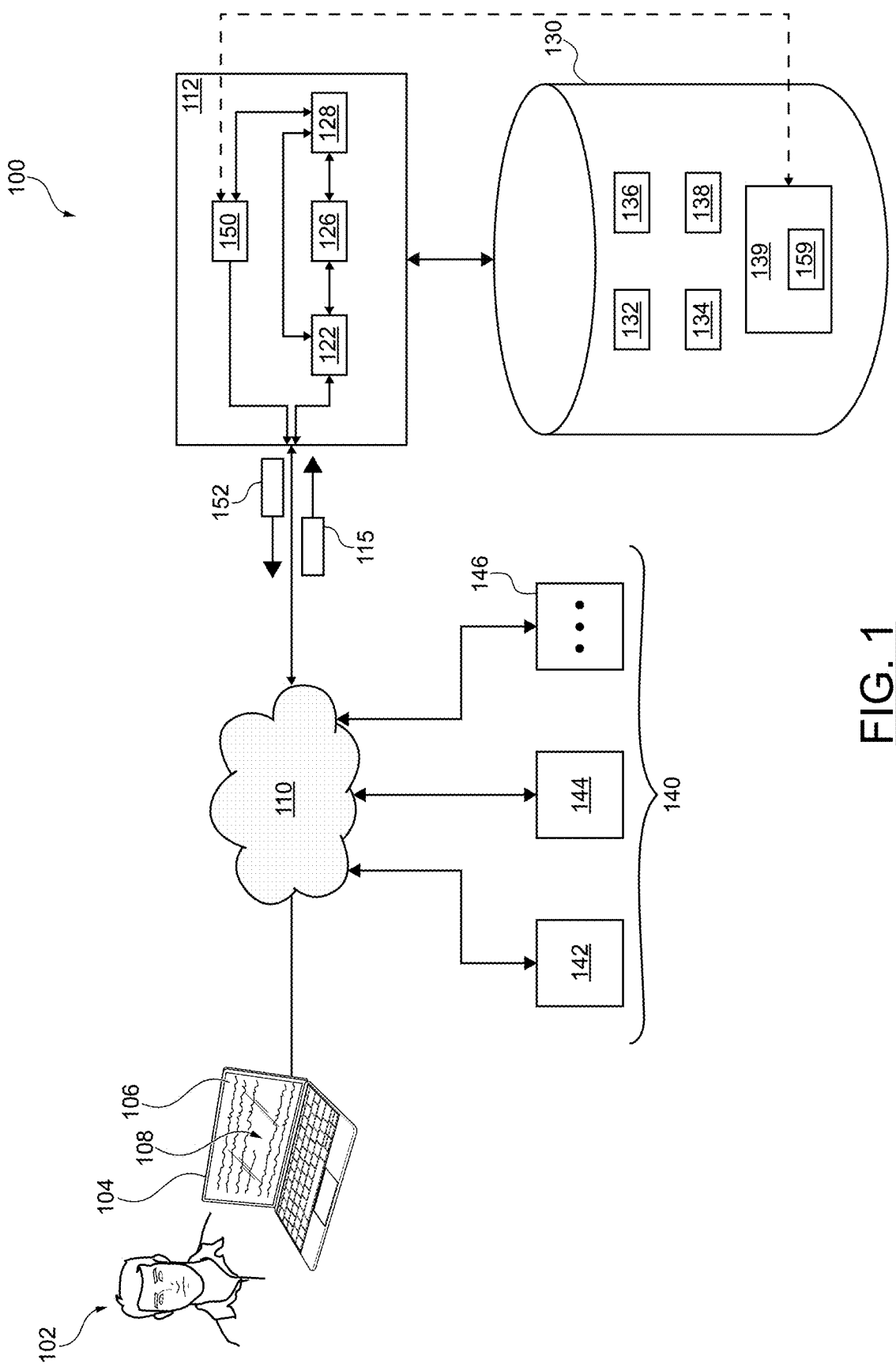
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide push notifications 152 to a user 102 of the system 100. The user 102 may be a subscriber to a notifications service provided by the system 100. However, the subscription does not need to be explicit or paid for. For example, the user 102 can become a subscriber by virtue of downloading an application from the system 100, by registering and provisioning a log-in/password combination, by registering and provisioning user preferences, and the like. Alternatively, the user 102 may become the subscriber without registering, for example, by accessing a news portal associated with the system 100.

As such, any system variation configured to generate push notifications 152 for the given user can be adapted to execute embodiments of the present technology, once teachings presented herein are appreciated. Furthermore, the system 100 will be described using an example of the system 100 being a push notification system (therefore, the system 100 can be referred to herein below as a "push notification system 100"). However, embodiments of the present technology can be equally applied to other types of the systems 100, as will be described in greater detail herein below.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways).

The electronic device 104 comprises hardware and/or software and/or firmware (or a combination thereof), as is known in the art, to execute a news update application 106 (also referred to herein as the "application 106"). Generally speaking, the news update application 106 is to enable the user to receive (or otherwise access) push notifications 152 provided by the system 100, as will be described in greater detail herein below.

How the news update application 106 is implemented is not particularly limited. One example of the news update application 106 may include a user accessing a web site associated with a news update service to access the news update application 106. For example, the news update application 106 can be accessed by typing in (or otherwise copy-pasting or selecting a link) an URL associated with the news update service, which can be available on a news portal, a web search engine portal, or the like. Alternatively, the news update application 106 can be an app downloaded from a so-called app store, such as APPSTORE™ or GOOGLEPLAY™ and installed/executed on the electronic device 104. It should be expressly understood that the news update application 106 can be accessed using any other suitable means. In yet additional embodiments, the news update application 106 functionality can be incorporated into another application, such as a browser application (not depicted) or the like. For example, the news update application 106 can be executed as part of the browser application, for example, when the user 102 first starts the browser application, the functionality of the news update application 106 can be executed.

In accordance with embodiments of the present technology, the news update application 106 on the electronic device 104 can receive push notifications 152 from the push notification server 112 and display the received push notifications 152 to the user 102 on the screen of the electronic device 104.

How the system 100 determines which push notifications 152 should be sent to the user will be discussed in greater detail herein below.

With continued reference to FIG. 1, the electronic device 104 is communicatively coupled to a communication network 110 for accessing a push notification server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. How a communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

The push notification server 112 can be implemented as a conventional computer server. In an example of an embodiment of the present technology, the push notification server 112 can be implemented as a Dell™ PowerEdge™ Server running the Microsoft™ Windows Server™ operating system. Needless to say, the push notification server 112 can be implemented in any other suitable hardware, software, and/or firmware, or a combination thereof. In the depicted non-limiting embodiments of the present technology, the push notification server 112 is a single server. In alternative non-limiting embodiments of the present technology, the functionality of the push notification server 112 may be distributed and may be implemented via multiple servers.

Referring again to FIG. 1, also coupled to the communication network 110 are a plurality of digital news sources 140, including a first digital news source 142, a second digital news source 144 and a plurality of additional digital news sources 146. The first digital news source 142, the second digital news source 144 and the plurality of additional digital news source 146 are all network news sources accessible by the electronic device 104 and the push notification server 112 (as well as other electronic devices potentially present in the system 100) via the communication network 110.

Any one of the plurality of digital news sources 140 is referred to herein as a "particular digital news source 142".

The digital news sources 140 can be any digital source that can provide digital news content. In at least some non-limiting embodiments of the present technology, the digital news sources 140 include, but are not limited to, news agencies (e.g. CNN™, LaPresse™), blogs, social media websites (e.g. Facebook™), etc.

Respective content of the first digital news source 142, the second digital news source 144 and the plurality of additional digital news sources 146 is not particularly limited.

A given one of the digital news sources 140 can contain (or in other words, host) digital content (i.e. one or more digital items each of the one or more digital items having one or more types of digital content). In some embodiments of the present technology, the content of the digital items can include, but is not limited to, digital news items. Such digital news items can include but are not limited to: digital news articles, blogs, news releases about and/or from various government institutions, news about points of interest, digital articles on various topics (where the topics may be time-sensitive or not), other multi-media content, and the like.

In some embodiments of the present technology, the content of the digital news items hosted by digital news sources 140 is text-based. It should be noted that "text-based" content does not intend to mean that the given digital item only contains text to the exclusion of other type of multi-media elements. On the contrary, the given text-based digital news item includes text elements, as well as potentially other type of multi-media elements. For instance, a given text-based digital item that is an article may have text, as well as photos and/or videos. As another example, a given text-based digital item that is a blog may include text, as well as embedded video elements.

With continued reference to FIG. 1, in accordance with embodiments of the present technology, the push notification server 112 comprises an aggregator 122, a news analyzer 128, and a notification pusher 150. The push notification server 112 can also comprise a cluster manager 126.

The aggregator 122 is configured to execute a "crawler" operation. In other words, the aggregator 122 can execute a robot that "visits" a plurality of digital news sources (such as the plurality of digital news sources 140 including the first digital news source 142, the second digital news source 144 and the plurality of additional digital news sources 146) and catalogues one or more digital news items 115 hosted by a respective one of the digital news sources 140. In some embodiments of the present technology, the aggregator 122 can catalogue the digital news items 115 into an index 134. The index 134 may comprise a forward index and/or inverted index, and cataloguing the digital news items 115 may include mapping a given digital item to a list of key words associated with the given digital item.

As part of the crawling function, the aggregator 122 is configured to maintain information representative of the digital news sources 140 and/or newly discovered content available therefrom. In some embodiments, the aggregator 122 can be configured to maintain the index 134 as an example in an aggregator (crawler) database 132 within the data storage device 130. In other embodiments, the aggregator 122 may also be configured to extract features from the newly discovered digital news sources 140 and/or newly discovered digital news items 115 available, and store the associated features, as a non-limiting example, in the aggregator database 132. Although depicted as separate of the push notification server 112 to which it is coupled to via a dedicated link (not numbered), the aggregator database 132 can be implemented as a part of the push notification server 112.

In some embodiments, the aggregator 122 may request the news analyzer 128 to provide a list of trustworthy digital news sources 140. In some embodiments, the aggregator 122 can have a direct access to a trustworthy source database (not shown). The population of the trustworthy source database is discussed further below.

In some embodiments, the aggregator 122 can crawl (visit) only trustworthy sources and catalogue one or more digital news items 115 hosted by the respective trustworthy digital news sources 140. The trustworthy digital news sources 140 may be listed in the trustworthy source database. In some embodiments, the aggregator 122 may also access digital news sources other than those listed as trustworthy digital news sources. The aggregator 122 may then transmit collected information about newly discovered digital news sources (not shown) to the news analyzer 128, and the news analyzer 128 may then determine whether the newly discovered digital news sources are trustworthy or not. In response to the newly discovered digital news sources being trustworthy, the news analyzer 128 may add the newly discovered digital news sources to the trustworthy source database.

In some embodiments of the present technology, the aggregator 122 may visit the digital news sources 140 regularly, for example, at the expiry of a crawling time period. For example, the crawling time period may be 15 minutes, 30 minutes, or an hour. In some embodiments, the crawling time period may be determined by an operator. Alternatively, the crawling time period may be determined by the push notification server 112 (e.g. by the analyzer 129) based on other information, such as, e.g., a push notification time period.

In alternative embodiments of the present technology, rather than executing its dedicated aggregator 122, the push notification server 112 can share the functionality of the aggregator 122 with another server (not depicted) and/or another service (not depicted). For example, the functionality of the aggregator 122 can be shared with a search engine server (not depicted) executing a search engine service.

When the aggregator 122 crawls and indexes new digital news sources that may potentially host digital news items, the aggregator 122 can also index such newly discovered (or updated) digital items for the purposes of the push notification server 112 routines described herein.

The push notification server 112 also comprises a cluster manager 126 for clustering the crawled digital news items 115 by themes (also referred to herein as "topics"). Generally speaking, the term "clustering" refers to the classification of the crawled digital news items 115 into different groups (e.g., clusters) so the crawled digital news items 115 in each cluster share some common theme.

Although the cluster manager 126 is depicted as being part of the push notification server 112, in alternative embodiments, the functionality of the cluster manager 126 may be distributed and may be implemented via multiple servers.

The cluster manager 126 may be configured to access the crawled digital news items 115 in the aggregator database 132 and cluster the crawled digital news items 115 from the aggregator database 132 into digital news clusters having the same theme based on its respective content. The manner in which the clustering is done is not limited, and may be done using the bag-of-words model, the latent dirichlet allocation model, just to name a few. K-nearest neighbors (KNN) based algorithms can also be used.

In some embodiments of the present technology, determining whether the digital news are associated with the same theme can be done by analyzing the body of text of the digital news item and/or title of the digital news item. This can be done by a trained machine-learning algorithm (MLA) for clustering, etc.

In some embodiments, number of clusters may be predetermined. In alternative embodiments, the number of clusters may be determined by the cluster manager 126 based, for example, on the number of news articles collected.

In some embodiments, the cluster manager 126 groups the digital news items 115 that were published within a cluster publication period into one cluster. In some embodiments, such cluster publication time period may be prior to a sampling time.

Same digital news sources 140 may publish several digital news items 115 on the same topic. In some embodiments of the present technology, the cluster manager 126 may ensure that one digital news cluster contains only one digital news item collected from one digital news source 142. For instance, the most recent digital news item published at the corresponding digital news source 142 on one cluster topic may be chosen to be part of the digital news cluster, while the other articles on the same cluster topic published by the same digital news source 142 would not be part of any cluster.

As will be discussed in more detail herein below, the clustered digital news items 115 are indexed and stored in a cluster database 136. Although depicted as separate of the push notification server 112 to which it is coupled to via a dedicated link (not numbered), the cluster database 136 can be implemented as a part of the push notification server 112.

The cluster manager 126 can be configured to generate the clusters periodically. In some embodiments, the cluster manager 126 can re-analyze at least a portion of digital news items 115 after a pre-determined cluster determination delay (e.g. every 15 minutes, every 30 minutes, every 1 hour, and the like).

The digital news clusters may be re-organized into a new set of digital news clusters based on various factors (e.g. newly obtained digital news items). In some embodiments, a particular digital news item, that was part of one cluster at one moment, may be moved by the cluster manager 126 to another cluster later.

Figure 2:
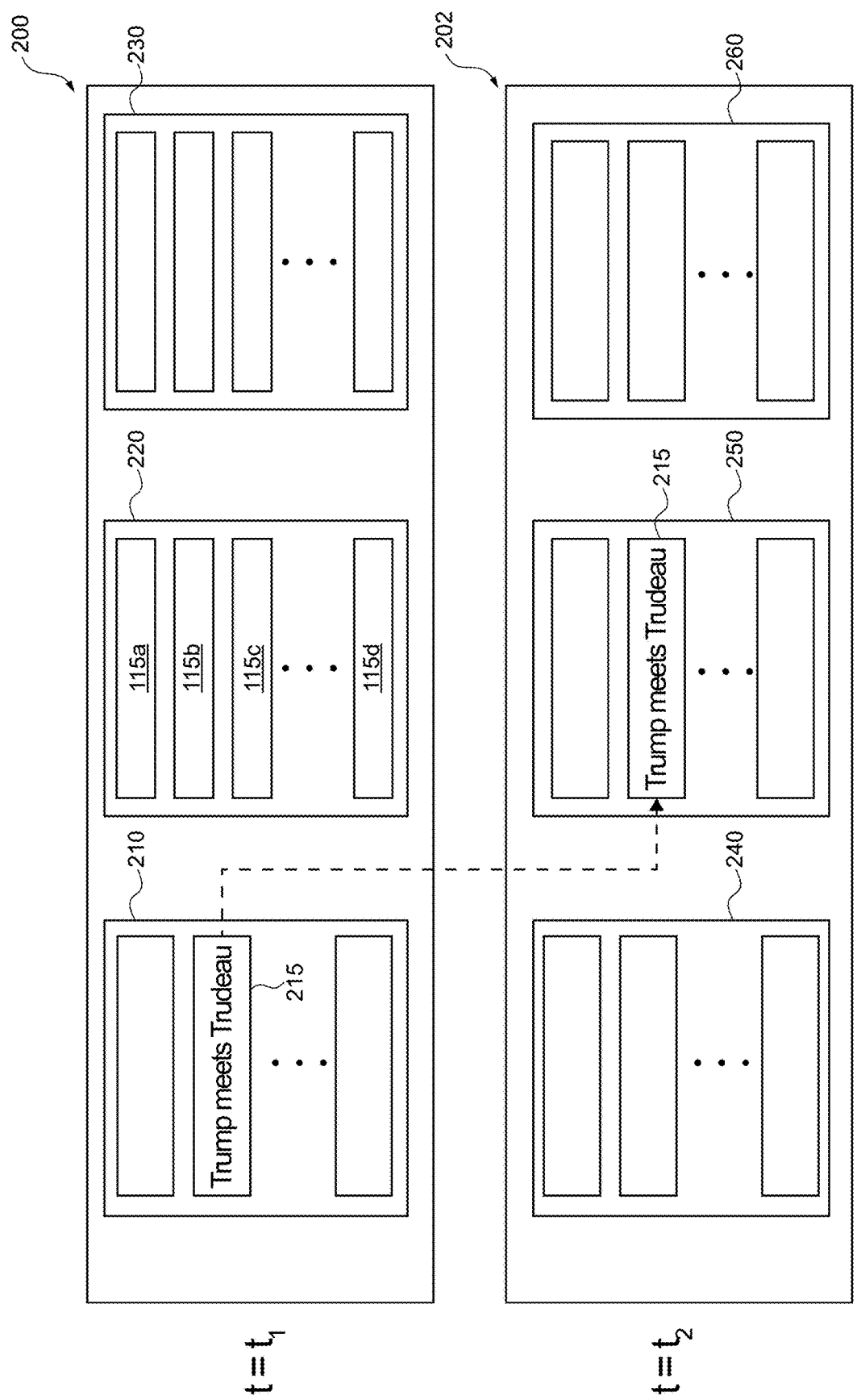
FIG. 2 depicts schematic examples of a first set of digital news clusters and a second set of digital news clusters, generated in different time moments, in accordance with non-limiting embodiments of the present technology.

Referring now to FIG. 2, which depicts schematic examples of a first set of digital news clusters 200 and a second set of digital news clusters 202, generated by the cluster manager 126 in different time moments, in accordance with non-limiting embodiments of the present technology. At FIG. 2, the first set of digital news clusters 200 is generated at a first time moment $t=t_1$, and has a first cluster 210, a second cluster 220, and a third cluster 230. The first cluster 210, the second cluster 220, and the third cluster 230 are each related to a first cluster topic, a second cluster topic and a third cluster topic, respectively. The second set of digital news clusters 202 is generated at a second time moment $t=t_2$, where $t_2$ occurs later than $t_1$, and has a fourth cluster 240, a fifth cluster 250 and a sixth cluster 260. The fourth cluster 240, the fifth cluster 250, and the sixth cluster 260 are each related to a fourth cluster topic, a fifth cluster topic and a sixth cluster topic, respectively.

In the first set of digital news clusters 200, the first cluster 210 is related to the first cluster topic "U.S. President" and the second cluster 220 is related to the second cluster topic "World Cup". In the second set of digital news clusters 202, the fourth cluster 240 is related to the fourth cluster topic, which is still "U.S. President" and the fifth cluster 250 is related to the fifth cluster topic "Canada". For example, an article 215 that was entitled "Trump meets Trudeau" may be a part of a first cluster 210 related to the first cluster topic "U.S. President" at time $t=t_1$, and the same article 215 entitled "Trump meets Trudeau" may be a part of the fifth cluster 250 at $t=t_2$.

The aggregator database 132 and the cluster database 136 both store information associated with a pool of digital news items. The aggregator database 132 comprises some or all of the digital news items 115 discovered by the aggregator 122. The cluster database 136 comprises some or all of the clusters with the digital news items.

With reference to each digital news item, the aggregator database 132 and the cluster database 136 store the digital news item itself and/or any other information related to that digital new item (e.g. URL of the location of that digital news item). The aggregator database 132 and the cluster database 136 also store the news item additional information related to that particular digital news item. The news item additional information comprises at least a news item publication time of that particular digital news item at the associated digital news source 140 and data related to the corresponding digital news source 140 where that digital news item was electronically published and later collected by the aggregator 122.

It should be noted that when referring herein to the cluster "having" the digital news item, it is contemplated that the cluster in the cluster database 136 has the digital news item itself and/or any other information related to that digital new item (e.g. URL of the location of that digital news item). As it is discussed herein in further detail, the cluster "having" the digital news item also has the news item additional information related to that particular digital news item.

Referring again to FIG. 1, the push notification server 112 also comprises the news analyzer 128. The news analyzer 128 has access to the aggregator database 132 and/or the cluster database 136, in order to access the digital news items and the additional information related to the digital news items.

In at least some embodiments, the news analyzer 128 can be configured to determine whether a particular digital news source 142 of the plurality of the digital news sources 140 is trustworthy. For example, such analysis may be based on the number of users accessing the particular digital news source 142 and/or a number of subscribers to the particular digital news source 142. For example, the particular digital news source 142 may be considered as "trustworthy" (also referred to herein as a "trusted news source") if the number of users of the particular digital news source 142 is higher than a threshold number of users and/or the number of subscribers of the particular digital news source 142 is higher than a threshold number of subscribers. The threshold number of users and/or the threshold number of subscribers may be determined empirically by an operator of the push notification server 112.

Alternatively, the news analyzer 128 may access a trustworthy source database (not shown) in the data storage device 130 and verify whether the particular digital news source 142 is "trustworthy" or not. Such trustworthy source database may be populated by an operator. Alternatively, the trustworthy source database may be populated by the news analyzer 128 once and/or may be updated later. For example, the trustworthy source database may be updated every week or every month, or within any other period of time.

The news analyzer 128 can then transmit this information to the aggregator 122 and/or the cluster manager 126. For example, the aggregator 122 may limit its crawling to the trustworthy sources only. Alternatively, the cluster manager 126 may use this information when building the clusters and may limit the digital news items 115 in the clusters to only those that were obtained from the trustworthy digital news sources 140.

In some embodiments of the present technology, the news analyzer 128 is configured to determine a source weight $W^S$ of a particular digital news source 142. For instance, the news analyzer 128 may determine a number of users accessing the associated digital news source 142 over a pre-determined past time interval.

For example, the digital news sources 140 with a large audience of readers (e.g. CNN.com) can publish the news faster compared to the digital news sources 140 with smaller audience. Using this fact may help to determine the importance of the news more accurately. The source weight $W^S$ of the particular digital news source 142 is higher when the number of users of this particular digital news source 142 is higher.

In some embodiments of the present technology, the number of users may be determined by the news analyzer 128 based on source statistics related to the particular digital news source 142. Such source statistics may be collected, for example, by the aggregator 122 and may be stored in a source database 138 and then analyzed by the news analyzer 128.

In some embodiments of the present technology, the source statistics related to the particular digital news source 142 may be obtained from browser logs that may be installed on one or more user electronic devices (for example, Yandex.Browser). The source statistics may also be obtained from a web site metric application installed on the respective digital news source 142 (for example, Yandex.Metrica). The source statistics may also be obtained from search engine logs data that may provide click information where clicks directed to the respective digital news source 142 from a search engine result page displayed to at least one search engine user (for example, Yandex.News). In other words, the news analyzer 128 may have access to search engine logs (not depicted) that store information about past users' searches, the Search Engine Response Pages (SERPs) that were generated in response to the users' queries, and click through information associated with the users' interactions with the SERPs. Within these embodiments, the news analyzer 128 can analyze the number of clicks of past users that led the users from the SERP to the particular digital news source 142.

In some embodiments of the present technology, the source statistics related to the digital news sources 140 may be collected along with the digital news item published at that digital news sources 140. In some other embodiments, the source statistics related to the digital news sources 140 may be collected separately from the digital news items. For example, the statistics related to various digital news sources 140 may be collected by the aggregator 122 before collecting the digital news items. The source statistics may also be collected and analyzed by the news analyzer 128 periodically, e.g. after expiry of a source analysis time period (e.g. every week). The source weight $W^S$ of the digital news sources 140 may thus be recalculated every time the source analysis time period has expired.

Each digital news item is published at the news item publication time by one of the digital news sources 140. In order to determine whether the digital news item is important, the news analyzer 128 can use the collected data related to the news item publication time and the data related to the digital sources. The higher is the source weight of the digital news source 142, the more likely the news item is important. The news analyzer 128 also takes into account the data related to the publication time of the news items. The less "fresh" is the digital news item, i.e. the more time has passed since the digital news item has been published, the less likely that digital news item is important. The news analyzer 128 can also take into account differences between publication time of one digital news item and publication times of other digital news items 115 (e.g. with respect to publication times of other digital news items 115 on a similar theme), as well as other characteristics related to publication time of digital news items, as discussed further below.

In accordance with at least some non-limiting embodiments of the present technology, for each of the digital news items 115 stored in the data storage device 130, the news analyzer 128 is configured to determine an importance score r associated with that digital news item.

The importance score r of the digital news item can be determined based on the news item publication time $t^{publ}$ and the source weight $W^S$ of the corresponding digital news source where that digital news item has been published. In accordance with at least some non-limiting embodiments, the importance score r is inverse to the news item publication time $t^{publ}$ and is proportionate to the source weight $W^S$.

In some embodiments of the present technology, the news analyzer 128 can determine a publication time function F(t) based on the news item publication time $t^{publ}$ of the digital news item. It is contemplated that the news items are more important when they are "fresh", that is right after the news have been published. The freshness of the digital news item can be determined by the push notification server 112 based on a difference between a sampling time $t^0$ and the news item publication time $t^{publ}$. The news analyzer 128 can use other relation between the sampling time $t^0$ and the news item publication time $t^{publ}$ such as, for instance, a ratio of sampling time $t^0$ to the news item publication time $t^{publ}$ or vice versa, etc.

In accordance with embodiments of the present technology, the publication time function F(t) can be a function that has the highest value at the news item publication time (i.e. when the calculation of the importance score is executed very soon after, or around, the publication time $t^{publ}$ i.e. $t^0 \cong t^{publ}$) The publication time function F(t) can gradually decrease with time further away from the news item publication time $t^{publ}$. For instance, the more time has passed since the publication of the digital news item, the lower is the publication time function F(t). For instance, the publication time function F(t) can have its minimum (e.g. close to zero) when $t^0 \gg t^{publ}$.

Figure 3:
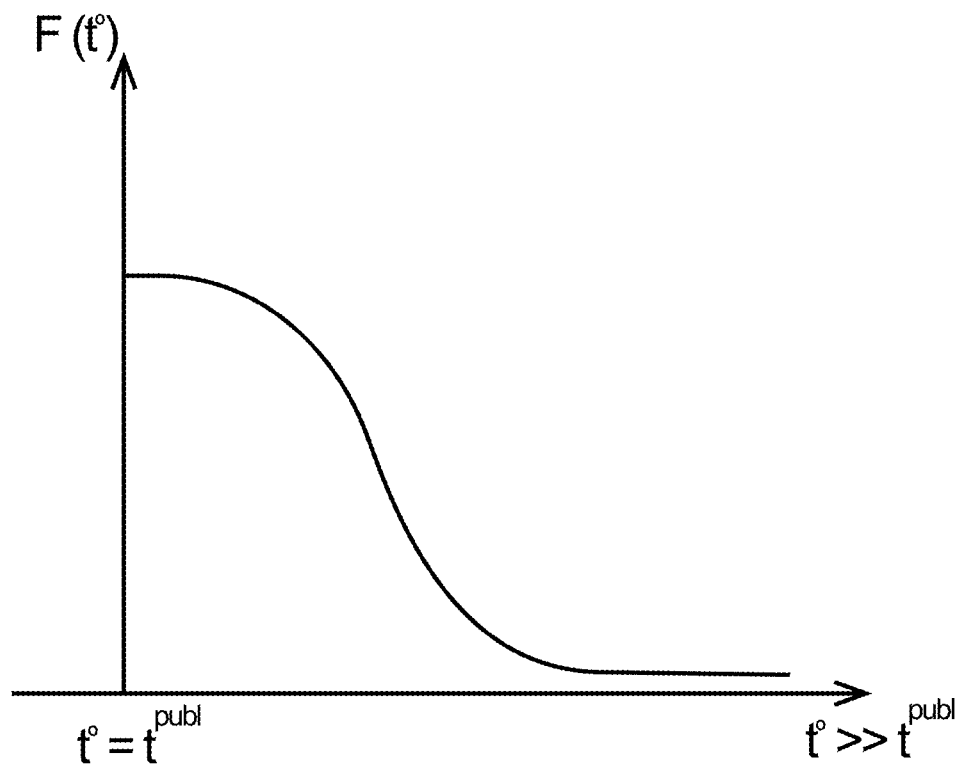
FIG. 3 depicts an example of the time function F(t) with respect to a sampling time and the news item publication time, in accordance with non-limiting embodiments of the present technology.

FIG. 3 depicts an example of the time function F(t) with respect to the sampling time $t^0$ and the news item publication time $t^{publ}$, in accordance with some non-limiting embodiments of the present technology. The time function F(t) has its maximum when $t^0 \cong t^{publ}$ and decreases towards 0 when $t^0 \gg t^{publ}$.

In accordance with embodiments of the present technology, the publication time function F(t) can be inverse to the news item publication time $t^{publ}$.

The importance score r of one digital news item can be determined according to the formula:

$$r(t) = W^S * F(t), \qquad (1)$$

where $W^S$ is the source weight of the corresponding digital news source that published the digital news item.

The importance score r(t) of the digital news item may be determined for a particular digital news item each time a score determination period expires.

In some embodiments of the present technology, the source weight $W^S$ may vary with time. As discussed above, the news analyzer 128 may determine $W^S$ after expiry of the source analysis time period. For instance, the source analysis time period may be longer than the score determination period. For instance, the source analysis time period may be several times longer than the score determination period.

At a sampling time $t = t^0$, the importance score $r(t^0)$ of the digital news item can be determined according to the formula:

$$r(t^0) = W^S * F(t^0). \qquad (2)$$

In some embodiments of the present technology, the publication time function F(t) can be determined, at the sampling time $t^0$, by the news analyzer 128 as follows:

$$F(t) = \text{sigm}(t^0 - t^{publ}), \qquad (3)$$

where sigm is a sigmoid function, and $(t^0 - t^{publ})$ is a difference between the sampling time $t^0$ and the news item publication time $t^{publ}$.

As discussed above, the cluster manager 126 can organize the plurality of digital news items 115 into a set of digital news clusters 200. The digital news items 115 at each particular cluster can be associated with one theme/topic.

Each of the clusters can have at least a subset of the plurality of digital news items 115. The news analyzer 128 can determine respective importance scores for each one of the plurality of digital news items 115 according to formula (1). As discussed above, each importance score r can be determined for each one of the plurality of digital news items 115 based on the respective news item publication time and source weight of the respective digital news source.

With reference to FIG. 2, one cluster 220 can have several digital news items 115 (depicted as digital news items 115a, 115b, 115c, 115d). A publication time function $F_k(t)$ of each k-th digital news item 115 within the digital news cluster 220 can be determined based on the news item publication time $t_k^{publ}$ of the k-th digital news item, k being an integer between 1 and a total number of digital news items 115 m within one digital news cluster 220.

Still with reference to FIG. 2, for the plurality of digital news clusters 200 the publication time function $F_k^S(t)$ can be determined for each k-th digital news item of each S-th cluster 220, where S is the integer between 1 and a total number of clusters $S_{max}$ within the plurality of digital news clusters 200.

For each cluster 220, the respective importance score $r_k$ for each one of the plurality of digital news items 115a, 115b, 115c ... 115d can be determined by the news analyzer 128 based on the respective news item publication time $t_k^{publ}$ and the source weight $W_k^S$ of the respective digital news source 140 where the respective one of the digital news items 115a, 115b, 115c ... 115d was published.

In some embodiments of the present technology, for each digital news cluster 220, the importance score $r_k^S$ of each digital news item 115 can be determined according to the formula:

$$r_k^S(t) = W_k^S * F_k(t), \quad (4)$$

where $W_k^S$ is the source weight of the corresponding digital news source of the k-th digital news item of the S-th digital news cluster. In formula (4), the publication time function $F_k(t)$ can be determined by the news analyzer 128 as described above with formula (3):

$$F_k(t) = \text{sigm}(t^0 - t_k^{publ}), \quad (5)$$

where sigm is a sigmoid function, and $(t^0 - t_k^{publ})$ is a difference between the sampling time $t^0$ and the news item publication time $t_k^{publ}$.

Based on respective importance scores $r_k^S$ of at least one digital news item 115 associated with that S-th digital news cluster 220, the news analyzer 128 can then determine a respective importance rank $R_S$ of each of at least one digital news cluster 220.

In some embodiments of the present technology, the importance rank $R_S$ of each digital news cluster 220 can be determined according to the formula:

$$R_S = \sum_{k=1}^{m} r_k^S(t). \quad (6)$$

Using the formula (4) for the importance score $r_k^S$ of each digital news item, the importance rank $R_S$ of each digital news cluster 220 can be determined according to the formula:

$$R_S = \sum_{k=1}^{m} W_k^S * F_k(t). \quad (7)$$

The importance rank $R_S$ of the digital news cluster 220 determined as described herein can be higher when many digital news sources 140 publish digital news items 115 on a similar topic within a short period of time. When the same digital news sources 140 publish digital news items 115 less frequently and over a longer period of time, i.e. when the time concentration of the digital news items 115 is lower, then the importance rank Rs of such digital news cluster 220 is lower.

Figure 4:
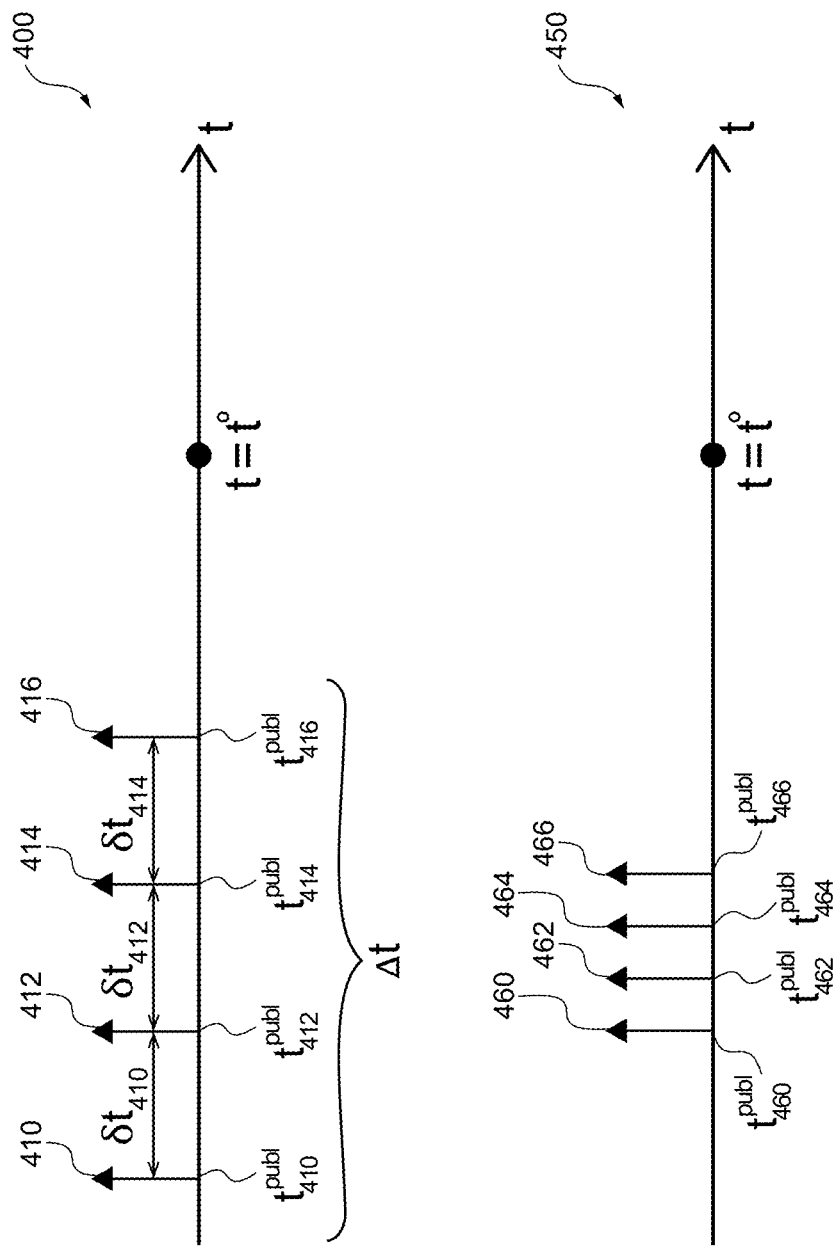
FIG. 4 schematically depicts publication events of digital news items for two digital news clusters, in accordance with non-limiting embodiments of the present technology.

FIG. 4 schematically depicts publication events of digital news items 410, 412, 414, 416 for the seventh digital news cluster 400 and publication events of digital news items 460, 462, 464, 466 for the eighth digital news cluster 450. Each digital news item 410, 412, 414, 416, 460, 462, 464, 466 has its respective news item publication time $t_{420}^{publ}$, $t_{422}^{publ}$, $t_{424}^{publ}$, $t_{426}^{publ}$, $t_{470}^{publ}$, $t_{472}^{publ}$, $t_{474}^{publ}$, $t_{476}^{publ}$.

In accordance with embodiments of the present technology, the news analyzer 128 can take into account a time concentration of publication (events) of various digital news items 115 by various digital news sources 140 on a time scale. The publication concentration as referred to herein can be determined as a number of publications of digital news items 115, $N^{\Delta t}$, per a concentration time period $\Delta t$.

In accordance with embodiment of the present technology, the news analyzer 128 may analyze a concentration of a number of times the digital news items 410, 412, 414, 416 have been published around the news item publication time.

Digital news items 410, 412, 414, 416 of a seventh cluster 400, related to a first topic, have lower concentration in time compared to the digital news items 460, 462, 464, 466 of the eighth cluster 450. The news analyzer 128 may determine the importance rank Rs using the formula (7) and determine that the importance rank Rs of the seventh cluster 400 is lower than the importance rank Rs of the eighth cluster 450.

When calculating the importance rank Rs, the news analyzer 128 can also take into account various characteristics related to publication time of digital news items 410, 412, 414, 416.

Referring again to FIG. 4, the news analyzer 128 can also take into account publication gaps $\delta t_{411}$, $\delta t_{413}$, $\delta t_{415}$ between two subsequent publications of the digital news items 410, 412, 414, 416 on the same (or similar) topics by the trusted digital news sources 140 (e.g. weighted by the source weight). Two subsequent digital news items 410, 412 of the same (or similar) topic can be, for example (and with reference to FIG. 2), two digital news items 115a, 115b of the same topic cluster 220. The news analyzer 128 may also determine an average publication spread of the digital news items published within the concentration time period $\Delta t$. The average publication spread $<\delta t>$ of the digital news items may be determined, for example, by determining average value of the publication gaps $\delta t_{411}$, $\delta t_{413}$, $\delta t_{415}$.

In at least some non-limiting embodiments of the present technology, when determining the importance score r of each digital news item, a time span between each of the respective digital news item publication time $t_{420}^{publ}$, $t_{422}^{publ}$, $t_{424}^{publ}$, $t_{426}^{publ}$, $t_{470}^{publ}$, $t_{472}^{publ}$, $t_{474}^{publ}$, $t_{476}^{publ}$ and a current time $t=t^0$ can be taken into account.

In accordance with embodiment of the present technology, the analyzing can be executed at a current time $t=t^0$ and, when determining the importance score r for the digital news item, a time delay T between the news item publication time, e.g. $t_{422}^{publ}$, and a pre-determined past time point $t_{past}$ that occurred between the current time $t^0$ and the news publication time, e.g. $t_{422}^{publ}$, can be taken into account.

The news analyzer 128 can also determine a spike in the time-related concentration of the publications of the digital news items.

Figure 5:
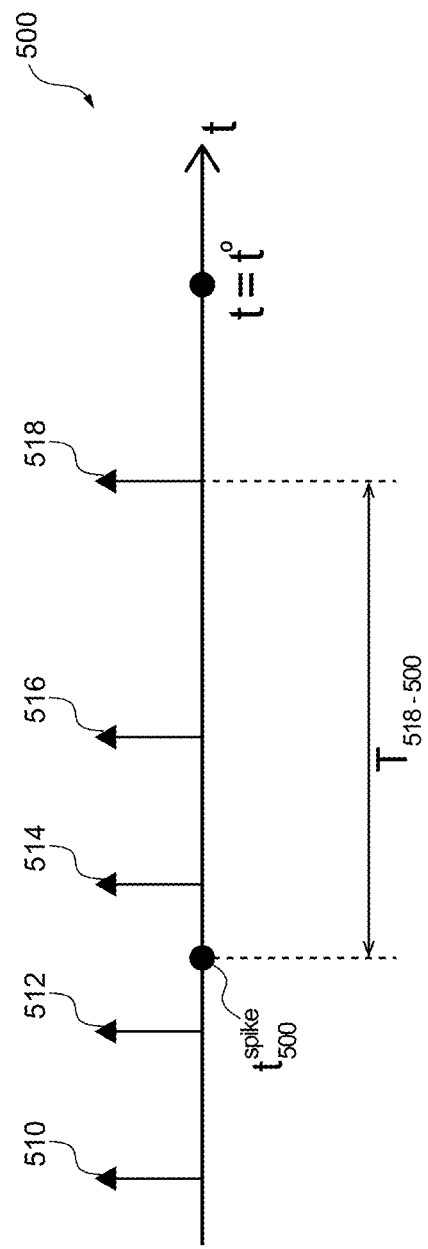
FIG. 5 schematically depicts publication events of digital news items for another digital news cluster, in accordance with non-limiting embodiments of the present technology.

Referring now to FIG. 5, in at least some embodiments, the news analyzer 128 may determine when the most of the digital news items in a particular cluster have been published. The news analyzer 128 can determine a spike time of publications of digital news items for several digital news items and/or for a digital news cluster. For example, with reference to FIG. 5, the cluster spike time $t_{550}^{spike}$ for a ninth digital news cluster 500 may be determined as a time when the most of the digital news items 510, 512, 514, 516 were published. For example, this may be a mode of $t_{520}^{publ}$, $t_{522}^{publ}$, $t_{524}^{publ}$, $t_{526}^{publ}$, e.g. the time of the major time-related concentration of publications of the digital news items 510, 512, 514, 516. The determined spike time $t_{550}^{spike}$ may be weighted by respective digital news source weights of the respective digital news sources that published the digital news items 510, 512, 514, 516.

In at least some non-limiting embodiments of the present technology, the pre-determined past time $t_{past}$ can be a point in time associated with the spike time $t_{550}^{spike}$. For example, the importance score $r_{518}$ for the digital news item 518 at FIG. 5 may be determined by taking into account the time delay between the publication time $t_{518}$ of the digital news item 518 and $t_{550}^{spike}$:

$$T_{518-550} = t_{518} - t_{550}^{spike} \qquad (8)$$

It should be noted that other characteristics related to publication times of the digital news items can be used in determining of the importance score r of particular digital news items and in determining of the importance rank $R_S$ of the digital news clusters. The news analyzer 128 may use statistics characteristics such as mode, median and mean of the publication news times in one cluster. For example, the spike of the concentration may be determined by determining the mode of the publication times of the digital news items by determining the most frequent value of the publication time in the cluster.

In at least some non-limiting embodiments of the present technology, the news analyzer 128 may determine the spike of publications of the digital news items 115 on the same (or similar topic) in the past. For example, the news analyzer 128 may determine that digital news items had a peak of publications in the past. The news analyzer 128 may then use this information in the analysis of subsequent publications.

In some embodiments, the aggregator 122 may catalogue digital news items that have not been published yet, referred to herein as unpublished digital items. For example, these unpublished digital items may be accessible by the aggregator 122 but not to general public. The one or more clusters 210, 220, 230 may store the unpublished digital items. The news analyzer 128 may determine an earlier spike of publications of the digital news items within one cluster and then use this information on earlier spike of publications of the digital news items on that particular topic in the analysis of the unpublished digital items.

In accordance with embodiments of the present technology, the news analyzer 128 can then select a representative digital news item for the at least one digital news cluster. In some embodiments, the news analyzer 128 may determine the representative digital news item based on the analysis of at least one of the following: the title of the digital news items within the cluster, a specific content found in the text body of the digital news items (e.g. the frequency of pre-determined words), a length of the text body of the digital news items (e.g. the number of words in the digital news article), the weight of the digital news source 140 that published that digital news item, the news item publication time, time-freshness of the digital news item (how recently it has been published compared to the sampling time $t^0$ within the associated at least one digital news cluster. It is contemplated that the news analyzer 128 can use other criteria to select the representative digital news item for the digital news cluster.

Referring again to FIG. 2, in accordance with embodiments of the present technology, the push notification server 112, e.g. notification pusher 150, is configured to generate push notifications 152 and to transmit the push notifications 152 to the electronic device 104.

In some embodiments of the present technology, the push notifications 152 may be generated periodically, at the expiry of the push notification time period. In some embodiments, the push notifications 152 may be sent on demand. For example, when the user enters a web portal of a news agency or a search engine, the system 100 can push the top 5 news notifications (in response to a request packet from the browser).

In accordance with embodiments of the present technology, the news analyzer 128 may generate push notifications 152 based on the digital news item that has the importance score above an importance score threshold. The push notification 152 may be generated based on the representative digital news item that has been determined for the digital news cluster which has the importance rank above the importance rank threshold.

In at least some embodiments, the importance rank threshold may be determined based on a target number of push notifications 152 of the plurality of push notifications 152. For example, the target number of push notifications 152 may be defined to be 5. The importance rank threshold may be then adjusted such that only 5 push notifications 152 related to the three important digital news items, i.e. digital news items with the highest importance rank, be generated and transmitted to the electronic device 104.

In accordance with embodiments of the present technology, the notification pusher 150 may store the information of the already push notifications 152 in the data storage device 130. For instance, the data storage device 130 may comprise a push notification database 139 and the notification pusher 150 may maintain such push notification database 139 that may include a database of past push notifications 159.

Prior to pushing the push notification 152 based on the representative digital news item, the notification pusher 150 may verify whether the representative digital news item has been already pushed within a threshold time interval. Thus the user may not be disturbed with the same push notification 152 related to the same digital news item, if that digital news item has been the most important for a long period of time. For instance, the threshold time interval may be provided by the user 102 through the input to the news update application 106 at the electronic device 104. Alternatively, the threshold time interval may be determined at the push notification server 112.

When verifying whether the representative digital news item has been already pushed, the notification pusher 150 may compare an indication of the push notification 152 with indications of the past push notifications 152 in the push notification database 139.

If the push notification 152 does not match any of the indications of past push notifications 152 stored in the push notification database 139, the notification pusher 150 may transmit the push notification 152 to the electronic device 104.

After generating the push notification 152 and/or transmitting the push notification 152 to the electronic device 104, the notification pusher 150 may update the past push notification database 159.

Referring again to FIGS. 1-2, in accordance with embodiments of present technology, the digital news clusters 210, 220, 230 may change with time. The push notification server 112 may store a log of URLs of all digital news items of one or more digital news clusters 210, 220, 230. Before transmitting the push notification 152, the notification pusher 150 may compare URLs of the one or more of old digital news clusters 210, 220, 230 with URLs of one or more new digital news clusters 240, 250, 260.

For example, if the push notification 152 corresponds to one of the digital news items of the fourth cluster 240, and, e.g. the first cluster 210 relates to the same topic as the forth cluster 240, the system 100 may compare URLs of the fourth cluster 240 with the URLs of the first cluster 210. In response to at least one URL matching, the push notification 152 related to the digital news item, for which the URL is matching, is not re-pushed by the notification pusher 150.

When one or more push notifications 152 are received by the electronic device 104, they can be displayed on the screen 108 of the electronic device 104 by the news update application 106.

Figure 6:
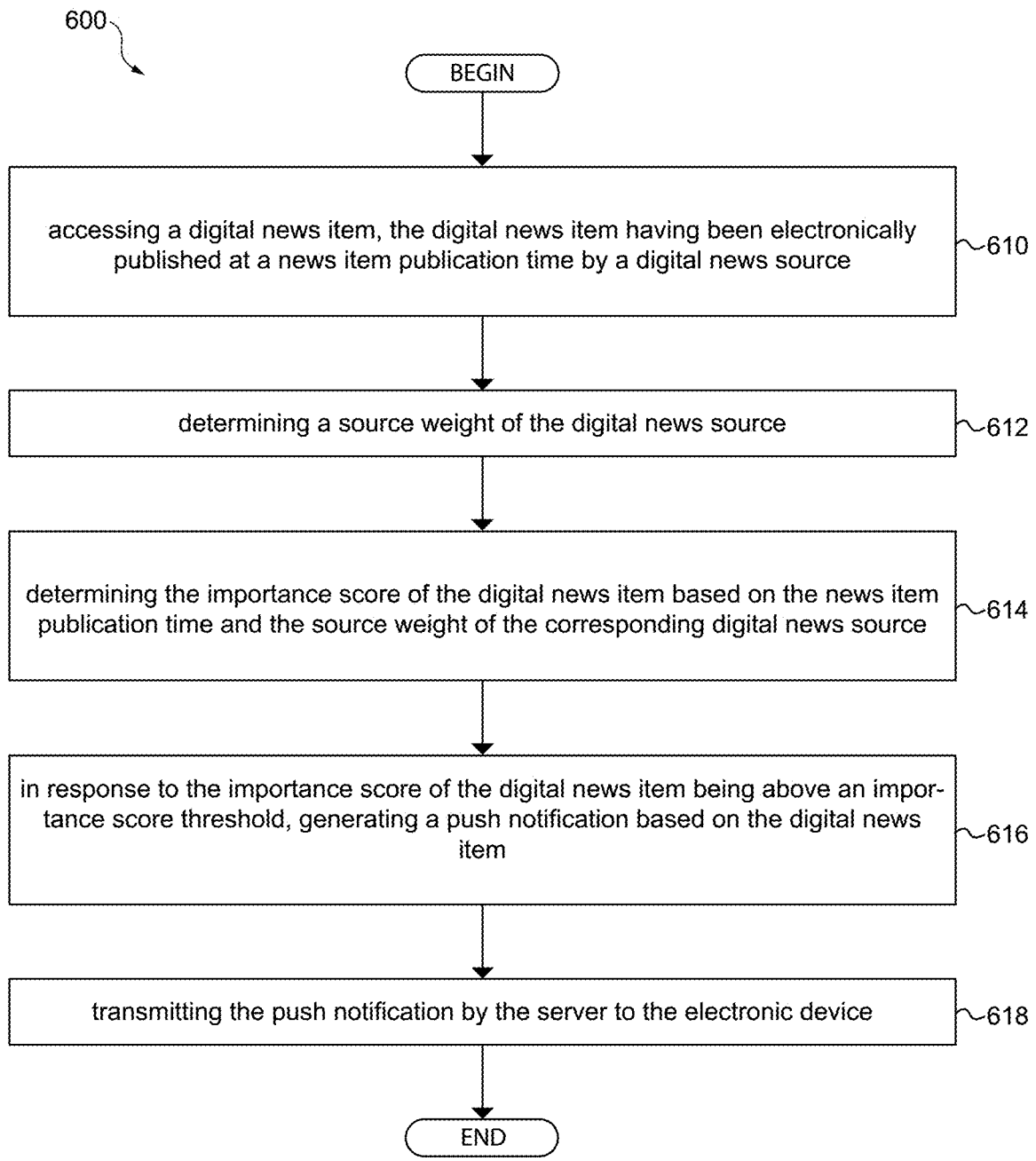
FIG. 6 depicts a block diagram of a flow chart of a method for determining an importance score associated with a digital news item, the method executable within the system of FIG. 1 in accordance with embodiments of the present technology.

Referring now to FIG. 6, which depicts a flowchart of a method 600 of determining an importance score associated with a digital news item, the method being executable in accordance with non-limiting embodiments of the present technology. The method 600 is executable by the push notification server 112, the push notification server 112 being connectable to the electronic device 104 via a communication network 110. The importance score is determined for determining push notifications 152 to be provided to the user 102 of the electronic device 104.

The method starts at step 610, where the push notification server 112 accesses a digital news item 115, the digital news item having been electronically published at a news item publication time by a digital news source 142, the digital news source 142 being accessible via the communication network 110.

At step 612, a source weight of the digital news source 142 is determined.

At step 614, the push notification server 112 determines the importance score of the digital news item 115 based on the news item publication time and the source weight of the corresponding digital news source 142.

At step 616, in response to the importance score of the digital news item 115 being above an importance score threshold, the push notification server 112 generates a push notification 152 based on the digital news item 115.

At step 618, the push notification server 112 transmits the push notification 152 to the electronic device 104.

Figure 7:
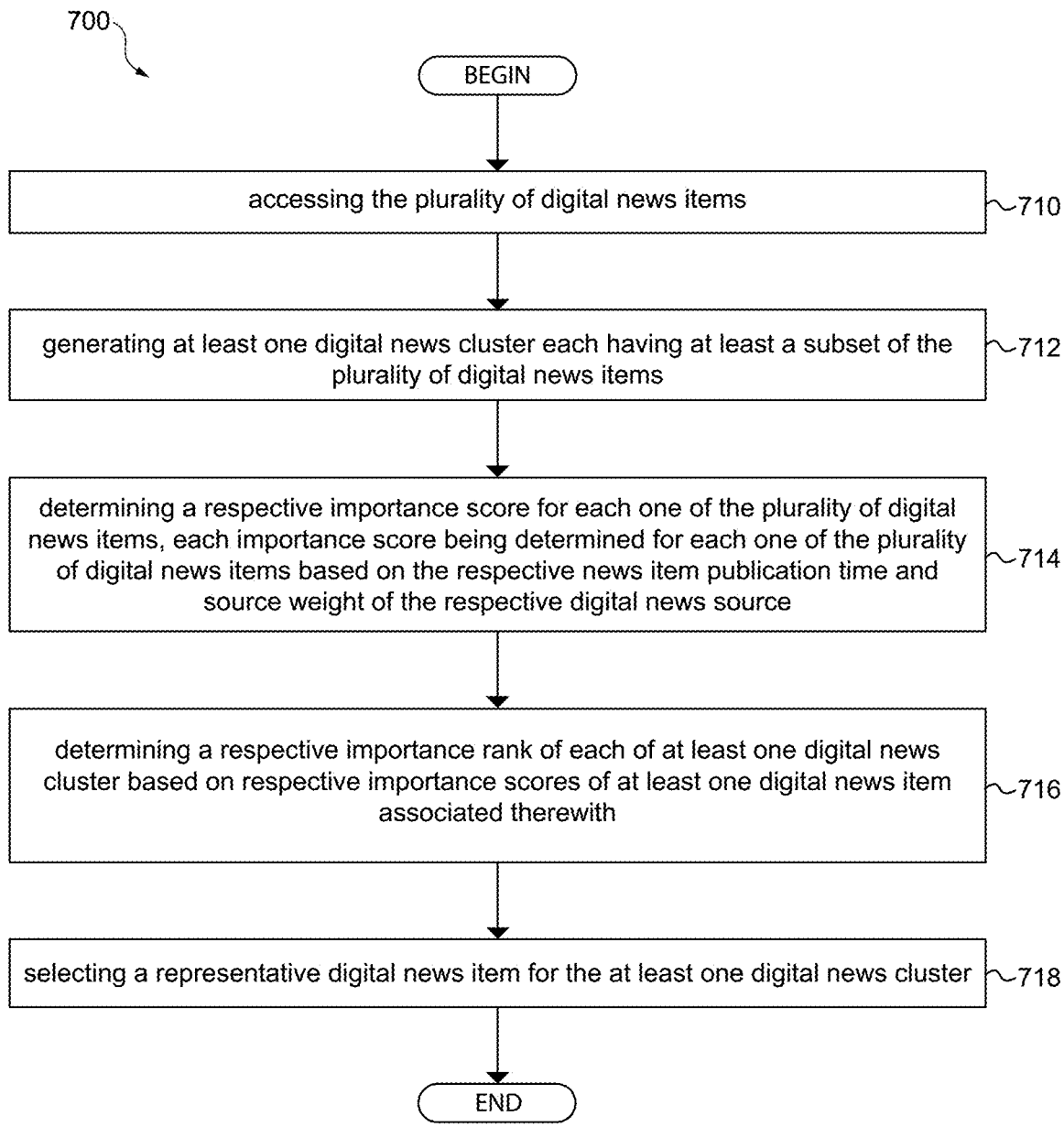
FIG. 7 depicts a block diagram of a flow chart of a method for determining the importance score associated with a digital news item, the method executable within the system of FIG. 1 in accordance with embodiments of the present technology.

FIG. 7 depicts a flowchart of a method 700 for determining an importance score associated with a digital news item, wherein the digital news item is one of a plurality of digital news items, according to non-limiting embodiments of the present technology.

At step 710, the push notification server 112 accesses the plurality of digital news items.

At step 712, the push notification server 112 generates at least one digital news cluster each having at least a subset of the plurality of digital news items.

At step 714, the push notification server 112 determines a respective importance score for each one of the plurality of digital news items. Each importance score can be determined for each one of the plurality of digital news items based on the respective news item publication time and source weight of the respective digital news source 142.

At step 716, the push notification server 112 determines a respective importance rank of each of at least one digital news cluster based on respective importance scores of at least one digital news item associated therewith.

At step 718, the push notification server 112 selects a representative digital news item for the at least one digital news cluster, and wherein the generating the push notification 152 is executed in response to the importance rank being above the importance rank threshold and the generating the push notification 152 is based on the representative digital news item.

It should be noted that even though the aggregator 122, the cluster manager 126, the news analyzer 128 and the notification pusher 150 have been described as separate entities each executing its respective functionalities, in alternative embodiments of the present technology, the functionality executed by the aggregator 122, the cluster manager 126, the news analyzer 128 and the notification pusher 150 can be executed by a single entity. Alternatively, the functionality executed the aggregator 122, the cluster manager 126, the news analyzer 128 and the notification pusher 150 can be distributed amongst more modules than the ones depicted in FIG. 1 and can be executed as part of multiple instances of the push notification server 112. Furthermore, each one of the aggregator 122, the aggregator 122, the cluster manager 126, the news analyzer 128 and the notification pusher 150 can execute additional functions (i.e. others than the respective functions described herein).

It should be apparent to those skilled in the art that at least some embodiments of the present technology aim to expand a range of technical solutions for addressing a particular technical problem, namely determining an importance score associated with a digital news item for determining push notifications 152 to be provided to the user of the electronic device, which may improve user's experience with regards to push notifications. The system and methods as described herein may help to automatically determine the push notifications 152 to be provided to the user of the electronic device.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining push notifications to be provided to a user of an electronic device, the method executable by a server, the server connectable to the electronic device via a communication network, the method comprising:

accessing, by the server, a plurality of digital news items, the plurality of digital news items having each been electronically published at a news item publication time by a digital news source, the digital news source being accessible via the communication network;

generating a digital news cluster having at least a subset of the plurality of digital news items, wherein each digital news item of the digital news cluster corresponds to a same theme;

determining, by the server, for each digital news item of the digital news cluster, and based on search engine log data, a number of users that accessed a digital news source associated with the respective digital news item over a pre-determined past time interval, wherein the search engine log data indicates click information where clicks are directed to the respective digital news source from a search engine result page displayed to at least one search engine user;

determining, by the server and for each digital news item of the digital news cluster, a source weight of the respective digital news source based on the number of users that accessed the respective digital news source;

determining, by the server, a respective importance score of each digital news item of the digital news cluster based on the respective news item publication time and the source weight of the respective digital news source;

determining, by the server, an importance rank for the digital news cluster based on importance scores of the digital news items of the digital news cluster;

selecting a representative digital news item of the digital news cluster based on a frequency of pre-determined words in the representative digital news item and a publication time of the representative digital news item;

in response to the importance rank of the digital news cluster being above an importance rank threshold, generating, by the server, a push notification based on the representative digital news item; and transmitting the push notification by the server to the electronic device.

2. The method of claim 1, wherein the selecting the representative digital news item is based on the time-freshness of the digital news items within the digital news cluster.

3. The method of claim 1, wherein the determining the number of users that accessed the digital news source comprises receiving statistics from:
browser logs installed on at least one user electronic device; and
web site metric application installed on the respective digital news source.

4. The method of claim 1, wherein the determining the respective importance score of each digital news item of the digital news cluster comprises determining the respective importance score that
is inverse to the news item publication time; and
is proportionate to the source weight.

5. The method of claim 1, wherein the determining the respective importance score of a digital news item of the digital news cluster comprises:
determining a publication time function F(t) based on the news item publication time of the digital news item; and
determining the importance score r of the digital news item according to the formula:

$$r = W^S * F(t),$$

where $W^S$ is the source weight of the corresponding digital news source of the digital news item.

6. The method of claim 5, wherein the determining the publication time function F(t) comprises determining:

$$F(t) = \text{sigm}(t^0 - t^{publ}),$$

where
sigm is a sigmoid function; and
$(t^0 - t^{publ})$ is a difference between a sampling time $t^0$ and the news item publication time $t^{publ}$.

7. The method of claim 1, wherein the determining the importance rank of the digital news cluster comprises:

determining a publication time function $F_k(t)$ of each digital news item of the digital news cluster based on the news item publication time of each digital news item, each of the digital news items being a k-th digital news item, k being an integer between 1 and a number of digital news items m within the digital news cluster;

determining the importance score $r_k$ of each digital news item according to the formula:

$$r_k = W_k^S * F_k(t),$$

where $W_k^S$ is the source weight of the corresponding digital news source of the k-th digital news item; and determining the importance rank of the digital news cluster according to the formula:

$$R = \Sigma_{k=1}^{m} r_k.$$

8. The method of claim 7, wherein the determining the publication time function $F_k(t)$ comprises determining:
$F_k(t) = \text{sigm}(t^0 - t_k^{publ})$,
where
sigm is a sigmoid function; and
$(t^0 - t_k^{publ})$ is a difference between a sampling time $t^0$ and the news item publication time $t_k^{publ}$.

9. The method of claim 1, further comprising, prior to pushing the notification based on the representative digital news item,
verifying whether the representative digital news has been already pushed within a threshold time interval.

10. The method of claim 9, wherein the method further comprises maintaining a push notification database that includes a list of past push notifications, and wherein:
the verifying whether the representative digital news item has been already pushed further comprises comparing an indication of the push notification with indications of past push notifications in the push notification database;
the transmitting the push notification is executed in response to the push notification not matching any of the indications of past push notifications stored in the push notification database; and
wherein the method further comprises updating the push notification database after the transmitting the push notification with the indication of the push notification.

11. The method of claim 1, wherein generating the digital news cluster comprises
determining digital news items published within a cluster publication time period.

12. The method of claim 11, wherein the cluster publication time period is prior to a sampling time.

13. The method of claim 1, wherein the push notification is one of a plurality of push notifications, and wherein the method further comprises:
determining the importance rank threshold based on a target number of push notifications.

14. The method of claim 1, wherein the determining the respective importance score of each digital news item comprises:
analyzing, by the server, a concentration of a number of times the respective digital news item has been published around the respective news item publication time.

15. The method of claim 14, wherein the analyzing further comprises taking into account a time span between the respective news item publication time and a current time.

16. The method of claim 14, wherein the analyzing is executed at a current time, and wherein the method further comprises taking into account a time span between the respective news item publication time and a pre-determined past time point that occurred between the current time and the respective news publication time.

17. The method of claim 16, wherein the pre-determined past time is a point in time associated with a spike in the concentration of the number of times the respective digital news item has been published.

18. The method of claim 1, wherein selecting the representative digital news item of the digital news cluster comprises selecting the representative digital news item based on a title of the representative digital news item.

19. The method of claim 1, wherein selecting the representative digital news item of the digital news cluster comprises selecting the representative digital news item based on a length of a text body of the representative digital news item.

20. A system for determining push notifications to be provided to a user of an electronic device, the system comprising at least one processor, and memory storing a plurality of executable instructions which, when executed by the at least one processor, cause the system to:

access a plurality of digital news items, the plurality of digital news items having each been electronically published at a news item publication time by a digital news source, the digital news source being accessible via the communication network;

generate a digital news cluster having at least a subset of the plurality of digital news items, wherein each digital news item of the digital news cluster corresponds to a same theme;

determine a respective importance score of each digital news item of the digital news cluster based on the respective news item publication time and a source weight of the respective digital news source;

determine an importance rank for the digital news cluster based on importance scores of the digital news items of the digital news cluster;

select a representative digital news item of the digital news cluster based on comparing a publication time of the representative digital news item to a sampling time of the representative digital news item and based on the source weight of the respective digital news source that published the representative digital news item;

in response to the importance rank of the digital news cluster being above an importance rank threshold, generate a push notification based on the representative digital news item; and transmit the push notification to the electronic device.

* * * * *